(12) United States Patent
Talwar et al.

(10) Patent No.: US 8,600,741 B2
(45) Date of Patent: Dec. 3, 2013

(54) METHOD OF USING MICROPHONE CHARACTERISTICS TO OPTIMIZE SPEECH RECOGNITION PERFORMANCE

(75) Inventors: Gaurav Talwar, Farmington Hills, MI (US); Rathinavelu Chengalvarayan, Naperville, IL (US); Jesse T. Gratke, Royal Oak, MI (US); Subhash B. Gullapalli, Royal Oak, MI (US); Dana B. Fecher, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 1228 days.

(21) Appl. No.: 12/194,605

(22) Filed: Aug. 20, 2008

(65) Prior Publication Data

US 2010/0049516 A1  Feb. 25, 2010

(51) Int. Cl.
*G10L 15/00* (2013.01)
(52) U.S. Cl.
USPC ........... 704/231; 704/234; 704/243; 704/244; 381/26; 381/63; 715/716
(58) Field of Classification Search
USPC .................................. 704/231, 234, 243, 244
See application file for complete search history.

(56) References Cited

U.S. PATENT DOCUMENTS

| | | | |
|---|---|---|---|
| 7,312,729 B2* | 12/2007 | Radakovic | 341/61 |
| 7,457,750 B2* | 11/2008 | Rose et al. | 704/244 |
| 2002/0049600 A1* | 4/2002 | L'Esperance et al. | 704/277 |
| 2003/0050783 A1* | 3/2003 | Yoshizawa | 704/270.1 |
| 2005/0147255 A1* | 7/2005 | Little | 381/26 |
| 2009/0063144 A1* | 3/2009 | Rose et al. | 704/236 |

OTHER PUBLICATIONS

Potter, D. "Overview and application of the IEEE P1451.4 smart sensor interface standard" Autotestcon Proceedings, Dec. 2002, IEEE, 2002, pp. 777-786.*

* cited by examiner

*Primary Examiner* — Vincent P Harper
(74) *Attorney, Agent, or Firm* — Anthony Luke Simon; Reising Ethington P.C.

(57) ABSTRACT

A system and method for tuning a speech recognition engine to an individual microphone using a database containing acoustical models for a plurality of microphones. Microphone performance characteristics are obtained from a microphone at a speech recognition engine, the database is searched for an acoustical model that matches the characteristics, and the speech recognition engine is then modified based on the matching acoustical model.

18 Claims, 5 Drawing Sheets

METHOD OF USING MICROPHONE CHARACTERISTICS TO OPTIMIZE SPEECH RECOGNITION PERFORMANCE

TECHNICAL FIELD

The present invention relates generally to Automatic Speech Recognition (ASR) systems and more particularly to techniques for tuning Automatic Speech Recognition systems to microphone characteristics.

BACKGROUND OF THE INVENTION

Automatic Speech Recognition (ASR) technologies enable microphone-equipped computing devices to interpret speech and thereby provide an alternative to conventional human-to-computer input devices such as keyboards or keypads. Many telecommunications devices are equipped with ASR technology to detect the presence of discrete speech such as a spoken nametag or control vocabulary like numerals, keywords, or commands. For example, ASR can match a spoken command word with a corresponding command stored in memory of the telecommunication device to carry out some action, like dialing a telephone number. Also, an ASR system is typically programmed with predefined acceptable vocabulary that the system expects to hear from a user at any given time, known as in-vocabulary speech. For example, during a voice dialing mode, the ASR system may expect to hear keypad vocabulary such as "Zero" through "Nine," "Pound," and "Star," as well as ubiquitous command vocabulary such as "Help," "Cancel," and "Goodbye."

ASR systems use microphones. And different microphones have a wide range of frequency response and sensitivity characteristics. The frequency response and particular sensitivity performance depends upon the microphone manufacturer, but significant differences exist even between seemingly identical microphones made by the same manufacturer. Due to existing tolerances in microphone production methods, differences exist between what would appear to be the same microphone. To compensate for the different microphones, ASR systems are programmed to process a wide spectrum of signals from microphones having a great variety of sensitivities and frequencies. For instance, while the ASR system may receive a signal from a particular microphone having a narrow frequency range and/or limited sensitivity, the ASR system will nevertheless operate as though the microphone provided a wide frequency range and great sensitivity. The ASR system operates in this manner because the system is unaware of the characteristics of the particular microphone. In short, compensating for various microphones involves an ASR system searching for sounds outside the performance characteristics of a microphone. As a result, the ASR system engages in needless processing that consumes energy and decreases response time and speech recognition accuracy.

SUMMARY OF THE INVENTION

According to an aspect of the invention, there is provided a method of tuning a speech recognition engine to an individual microphone. The method includes (a) providing a database containing acoustical models for a plurality of microphones; (b) receiving microphone performance characteristics from a microphone at a speech recognition engine; (c) searching the database for an acoustical model that matches the characteristics; and (d) modifying the speech recognition engine based on the matching acoustical model.

According to another aspect of the invention, there is provided a method of tuning a speech recognition engine to an individual microphone. The method includes (a) receiving microphone performance characteristics that are stored at a microphone; (b) searching a database for an acoustical model that matches the microphone performance characteristics; (c) uploading a matching acoustical model and applying the model to the speech recognition engine if an acoustical model matches the microphone performance characteristics; and (d) selecting at least one characteristic and limiting the processing range of the speech recognition engine based on the selected characteristic if an acoustical model does not match the microphone performance characteristics.

According to another aspect of the invention, there is provided a method of tuning a speech recognition engine to an individual microphone. The method includes (a) providing a database containing acoustical models for a plurality of microphones; (b) receiving microphone performance characteristics from a digital microphone at a speech recognition engine; (c) searching the database for an acoustical model that matches the microphone performance characteristics; (d) if an acoustical model is not matched to the microphone performance characteristics, sending new microphone performance characteristics to the digital microphone; (e) reconfiguring the digital microphone to perform based on the new data parameters; and (f) saving the new data parameters at the microphone.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below can be used to tune an Automatic Speech Recognition system (ASR) or engine to a microphone used with that system. Presently, many microphones can provide service details or performance characteristics such as frequency response and/or sensitivity. The performance characteristics are stored at the microphone as microphone characteristic data and can be accessed using a speech recognition system. When used with the speech recognition system, the microphone can provide the performance characteristics to the system either on demand or when powering on. The ASR system and method described herein takes advantage of this microphone data and can use it to access acoustical models saved on a server or located on the ASR system. Each acoustical model can correspond to the performance characteristics of a particular microphone. Or an acoustical model can correspond to the performance characteristics of several microphones. The ASR system can locate an acoustical model that either matches the performance characteristics of the particular microphone or closely mimics those characteristics. Alternatively, if an acoustical model does not acceptably match the microphone, the ASR system can read the performance characteristics that were stored at the microphone and make adjustments in the feature extraction phase of the speech recognition process based on the performance characteristics. The performance characteristics received from and stored at the microphone can help the ASR system adapt to the microphone and provide more accurate speech recognition and a reduction in processing time.

Communications System—

Figure 1:
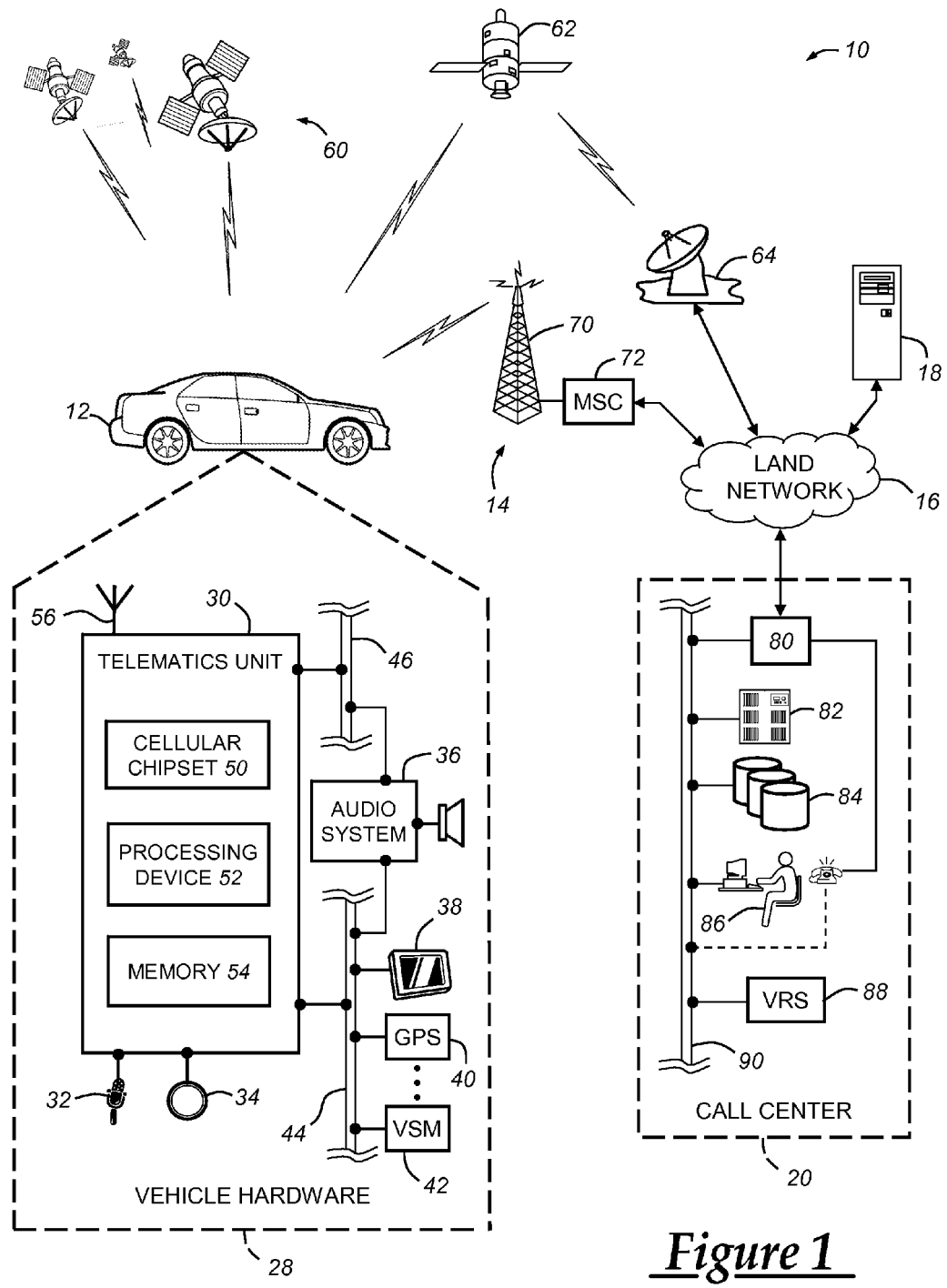
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Exemplary ASR System

In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 2:
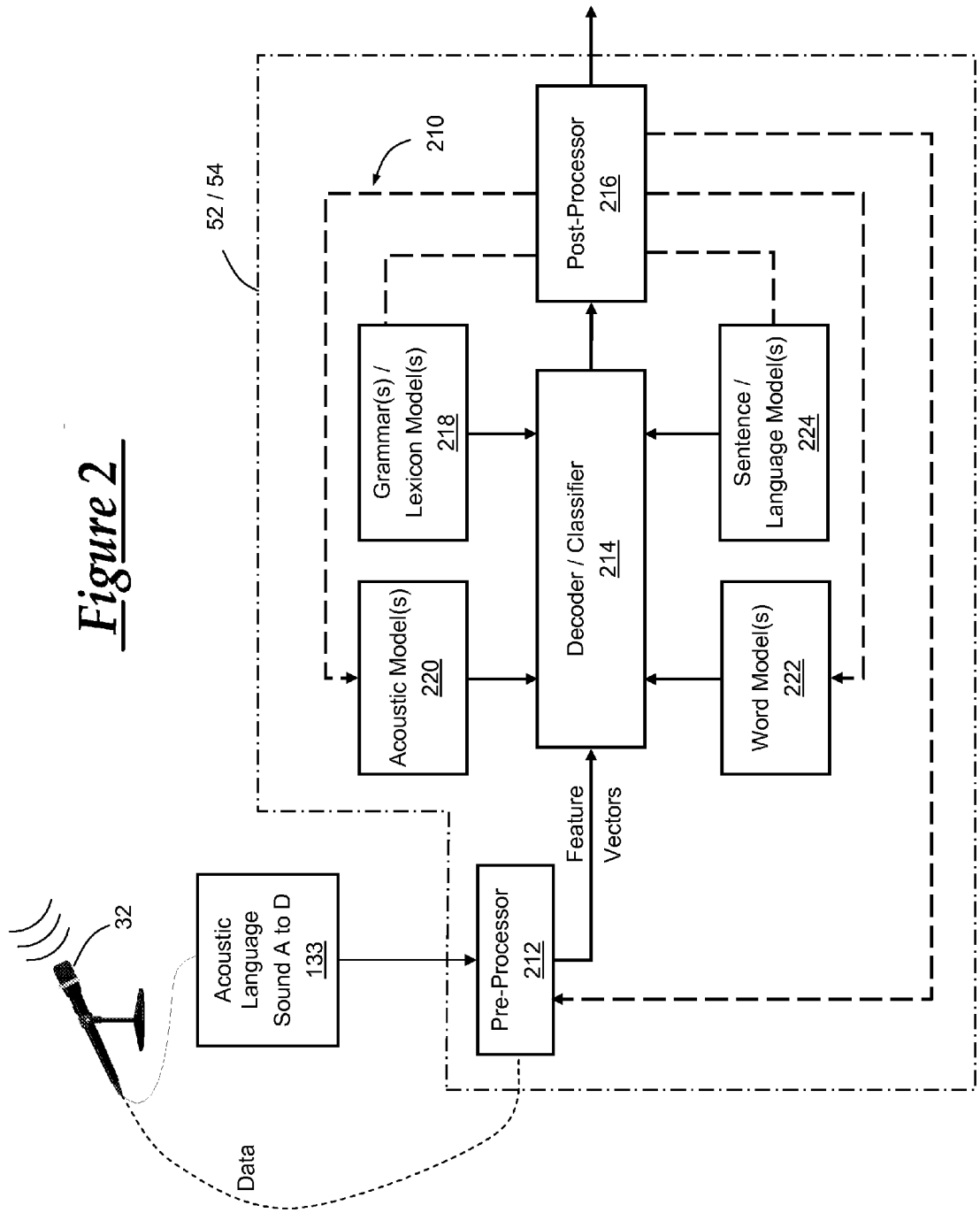
FIG. 2 is a block diagram depicting an exemplary embodiment of an automatic speech recognition system.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 32, and an acoustic interface 133 such as a sound card of the telematics user interface 128 to digitize the speech into acoustic data.

The system 210 also can receive data from the microphone 32 in the form of microphone performance characteristics or microphone characteristic data. The microphone 32 can be a condenser, capacitor, or an electrostatic microphone. One type of microphone 32 is an electret condenser microphone (ECM). Some ECMs use junction field effects transistors (JFETs) and also incorporate integrated circuits into their design. The integrated circuit (IC) may also include a type of memory, such as an EEPROM, for storing microphone performance characteristics. ECMs can also be described as digital microphones 32 and include a bandpass filter or a digital filter. Some ECMs replace JFETs with active transistors, binary junction transistors (BJT), or large transistors. Because many models of microphones 32 exist and because similar microphones 32 may perform differently due to differences in constructions, different microphones 32 can exhibit a variety of microphone performance characteristics. For instance, two microphones of the same model may employ a diaphragm with different flexibilities. The difference in flexibilities can affect the performance of the microphones. An example of a microphone performance characteristic is sensitivity. Sensitivity can indicate how the microphone converts acoustic pressure to out put voltage. Sensitivity can also be described as a noise floor below which the microphone may not detect sound or speech. Another example of a microphone performance characteristic is frequency response. Frequency response can define a low frequency cut-off and a high frequency cut-off. The microphone 32 may not detect sound above or below the high and low frequency cut-offs, respectively. The frequency response can also denote the sensitivity performance of the microphone 32 between the low frequency cut-off and high-frequency cut-off.

The microphone can also store microphone characteristic data using Transducer Electronic Data Sheets (TEDS). TEDS is a standard outlined by IEEE 1451.4 that can enable the automatic detection and identification of microphone characteristic data. IEEE 1451.4 is a standard that can define how an analog transducer can inherit self-describing capabilities for simplified plug and play operation. The standard can be implemented as a mixed-mode interface that retains an analog sensor signal, but adds a serial digital link for accessing a transducer electronic data sheet (TEDS) embedded in the microphone for self-identification and self-description. The TEDS data sheet can be stored on a data storage device, such as EEPROM or other non-volatile (NV) memory, using 256 bits. TEDS can be used with microphones having either an analog signal or a digital signal. TEDS can also be retrofitted to analog or digital microphones presently installed in ASR systems 210. A TEDS unit can be added to the microphone 32 and communicate the frequency response and the sensitivity of the microphone 32 to the ASR system 210. This TEDS data can be provided via the interface 133 or optionally directly to pre-processor 212.

The microphone characteristic data can be determined by testing individual microphones 32 and saving the results at the microphone 32. In another example, the microphone characteristic data can be provided by a microphone manufacturer and saved at the microphone 32.

The system 210 also includes a memory such as the telematics memory 54 for storing the acoustic data and storing speech recognition software and databases, and a processor such as the telematics processor 52 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. The acoustic model(s) 220 can also include individual schemes or programs tailored to any number of individual microphones. A program can contain microphone performance characteristics that include frequency response, sensitivity, signal bandwidth, and/or output voltage. The program(s) can also contain ASR system settings that specify the performance characteristics of a microphone. Acoustical model(s) 220 can be used to improve the send-side signal quality of a particular microphone. This improvement can be accomplished by limiting the high-frequency encoding algorithm to the signal bandwidth generated by the microphone 32. Acoustical model(s) can also be used to make adjustments in the feature extraction phase of the system 210. The Acoustical model(s) 220 can also modify noise reduction and echo cancellation blocks. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 133. A sound-responsive element in the microphone 32 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module 212 transforms the continuous stream of digital speech data into discrete sequences of acoustic parameters. More specifically, the processor 52 executes the pre-processor module 212 to segment the received speech input into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities there between, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system 210 and stored in memory. Those skilled in the art will also recognize that stored reference patterns can be manipulated, wherein parameter values of the reference patterns are adapted based on differences in speech input signals between reference pattern training and actual use of the ASR system 210. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Method—

Figure 3:
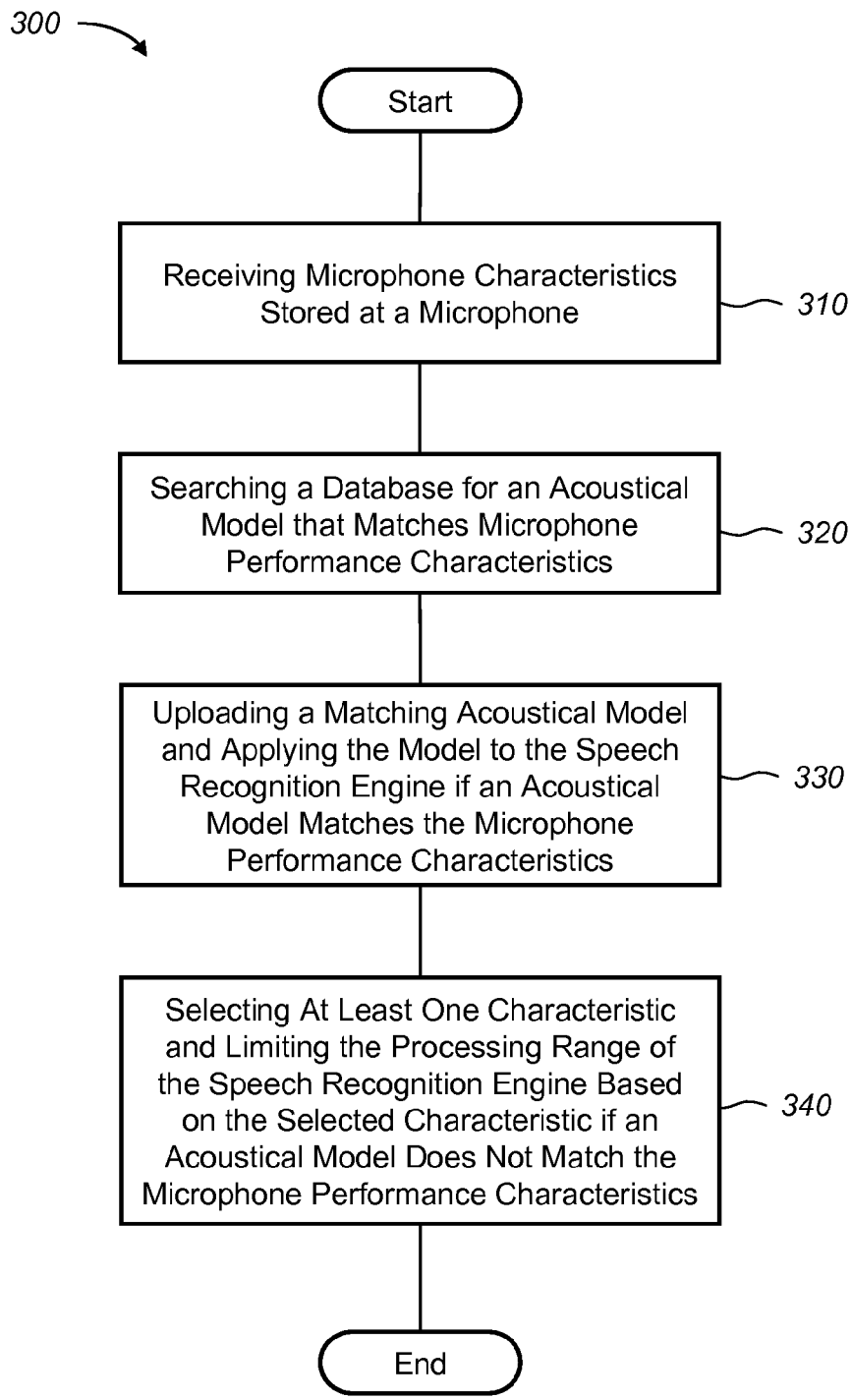
FIG. 3 is a flow chart of an exemplary embodiment of the method.

Turning now to FIG. 3, there is a block diagram of an exemplary embodiment of a method of tuning an ASR system to an individual microphone.

The method 300 begins at step 310. At step 310, microphone performance characteristics that are stored at a microphone are received. Microphone performance characteristics stored at the microphone 32 can be transmitted from the microphone 32 to the ASR system 210. Again, these microphone characteristics can be stored in a TEDS data sheet or other suitable form in an EEPROM or other non-volatile (NV) memory. The characteristics can be transmitted directly from the microphone 32 to the ASR system 210 or can be transmitted via the vehicle bus 44. The characteristics can be transmitted when a vehicle 12 is manufactured and outfitted with the microphone 32, when the microphone 32 is replaced, or the ASR system 210 updates its software or materially changes in some way. The method 300 then proceeds to step 320.

At step 320, a database is searched for an acoustical model that matches the microphone performance characteristics. The telematics unit 30 can employ the processing device 52 to search for an acoustic model 220 that matches the characteristics of the microphone 32. In another example, the method can include searching for an acoustic model 220 by using the telematics unit 30 to contact the call center 20 and access the server 82. Much of the processing and searching can be completed at the call center 20. When an acoustic model 220 matching the performance characteristics of the microphone is located, the call center 20 can send an message to the vehicle 12 informing the telematics unit 30 that a matching model 220 has been found. The telematics unit 30 can then later download the model 220 at an appropriate time and save it in memory 54. Alternatively, the call center 20 can send the model 220 immediately upon locating the model 220 that matches the performance characteristics of the microphone 32. The method 300 then proceeds to step 330.

At step 330, if an acoustical model matches the microphone performance characteristics, the matching acoustical model is uploaded and applied to the speech recognition engine. For instance, if the telematics unit 30 uploads a matching model 220, the model 220 can include microphone performance characteristics such as a frequency range. If the model 220 indicates that the frequency range has an upper limit of 5 KHz, the system 210 can modify its algorithms, such as its pre-processor 212 and halt processing of sound frequencies greater that 5 KHz. The system 210, without the microphone characteristic data, normally may have processed sound in a range that extended to 20 KHz, but by reducing the range over which the system 210 processes sound, processing time can be reduced. The method then proceeds to step 340.

At step 340, if an acoustical model does not match the microphone performance characteristics, at least one characteristic microphone performance characteristic is selected and the processing range of the speech recognition engine is limited based on the selected characteristic. For example, if the processing device 52 or the call center 20 cannot locate a suitable model 220, a default acoustic model 220 can be modified with the received microphone performance characteristics. The modifications can be accomplished by making adjustments in the feature extraction phase of the speech recognition process. The feature extraction phase can be calculated in the frequency domain. Using a performance characteristic such as the high cut-off frequency, described in this example as 5 KHz, the system 210 can instruct the preprocessor 212 to reduce the cepstral parameters up to the high cut-off. As a result, only frequencies below the cut-off frequency will be used for speech extraction. A similar process can be employed for low end cut-off frequencies. Limiting the frequency over which the system 210 searches minimizes the signal processing effort used to operate the system 210. Alternatively, if the microphone 32 is a digital microphone, the ASR system 210 can access the default model 220 and read the microphone performance characteristics from the default model. The ASR system 210 can then send the microphone performance characteristics directly to the microphone 32 or via the vehicle bus 44. The microphone 32 can then save the microphone performance characteristics received from the system 210 in the EEPROM or as a TEDS data sheet.

Figure 4:
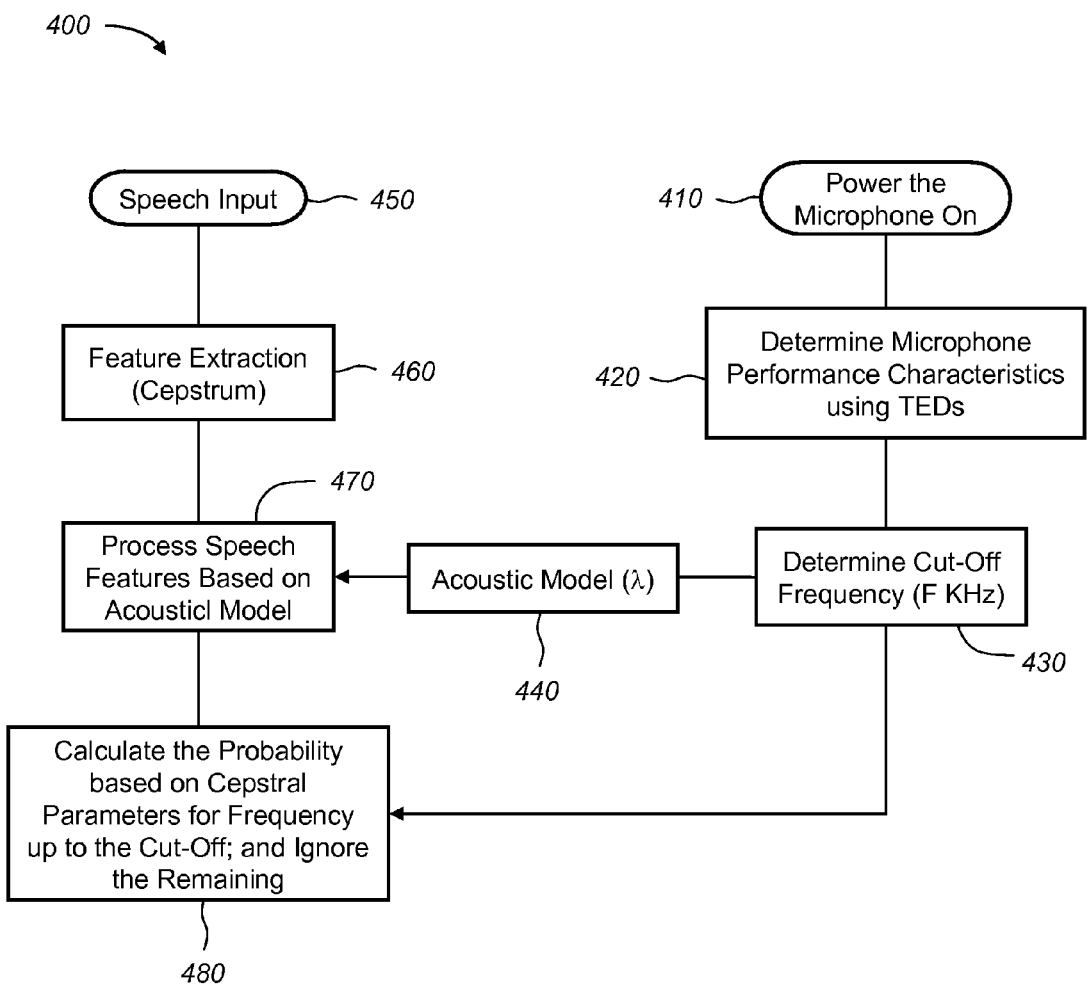
FIG. 4 is a flow chart of an exemplary embodiment of the method.

Turning now to FIG. 4, another exemplary embodiment of a method of tuning an ASR system to an individual microphone is shown in a block diagram.

The method 400 begins at step 410 with providing power to the microphone 32. The microphone 32 can be linked to a battery in the vehicle 12 and selectively powered based on commands from the telematics unit 30 or the user. Once power is provided to the microphone 32, the method proceeds to step 420.

At step 420, the microphone performance characteristics are determined using TEDS. A TEDS unit carried by the microphone 32 can include the microphone characteristic data at the microphone 32 and provide the data on demand. The TEDS unit on the microphone 32 can enable the automatic detection and identification of microphone performance characteristics by the ASR system 210 or the telematics unit 30. Again, this includes characteristics such as the frequency response and the sensitivity of the microphone 32, and this data can be stored on the microphone using TEDS or any other suitable format and/or protocol. The method 400 then proceeds to step 430.

At step 430, the cut-off frequency of the microphone is determined. For instance, the ASR system 210 or the telematics device 30 can signal the microphone and the microphone will provide its performance characteristics. The cut-off frequency can be identified using the performance characteristics stored on the TEDS unit on the microphone 32. The cut-off frequency can be wirelessly transmitted from the microphone 32 to the ASR system 210 or telematics unit 30. The frequency can also be transmitted via the vehicle bus 44. The cut-off frequency can be transmitted when a vehicle 12 is manufactured and outfitted with the microphone 32, when the microphone 32 is replaced, or the ASR system 210 updates its software or materially changes in some way. Alternatively, the cut-off frequency can also be transmitted when the user or the telematics device 30 requests. The method 400 then proceeds to step 430.

At step 440, an acoustical model is identified at the ASR system 210. In this embodiment, a plurality of acoustical models are pre-trained and stored at the ASR system 210 or the telematics unit 30. Each acoustical model includes unique performance characteristics and each can be applied to a different microphone. In another embodiment, the acoustical models can be stored at the servers 82 at the call center 20. The ASR system 210 or processing device 52 can search for an acoustical model that corresponds to the cut-off frequency determined for a particular microphone 32. When a match is found, the method 400 then proceeds to step 450.

At step 450, speech input is received. The speech input can be received at the microphone 32 and transmitted to the ASR system 210. The method 400 then proceeds to step 460.

At step 460, features of the speech input are extracted. After the analog speech input is converted to a digital signal, the signal is sampled and speech features can be extracted from the signal. Such speech features include vocal pitch, energy profiles, spectral attributes, and/or cepstral attributes as described above. The method 400 then proceeds to step 470.

At step 470, the ASR system 210 processes the speech features based on the acoustical model identified in step 440. For instance, if the acoustical model specified the cut-off frequency from step 430, the ASR system 210 would stop processing or looking for speech features above the cut-off frequency. Reducing the range of search reduces the complexity of the process and can speed the processing of speech input. The method 400 then proceeds to step 480 where the probability for frequency cut-off is calculated based on cepstral parameters and the remaining frequency is ignored. Techniques for this are known to those skilled in the art.

Figure 5:
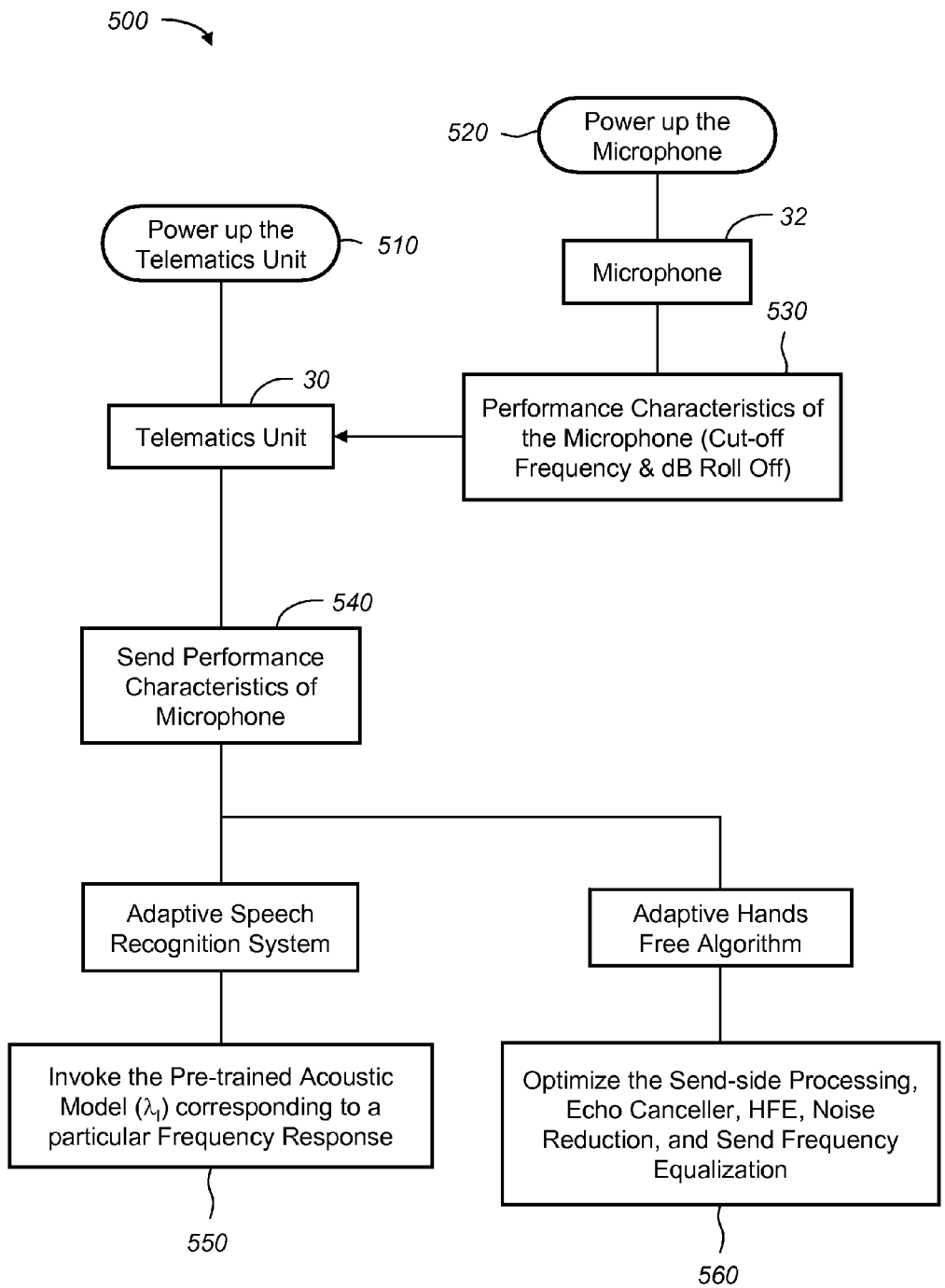
FIG. 5 is a flow chart of an exemplary embodiment of the method.

Turning to FIG. 5, another exemplary embodiment of a method of tuning an ASR system to an individual microphone is shown in a block diagram.

The method 500 begins at step 510 with powering the telematics unit 30. The telematics unit 30 can be powered by the battery in the vehicle 12. The telematics unit 30 can be powered or activated by the user, the call center 20, or a schedule stored on the telematics unit. The method 500 then proceeds to step 520.

At step 520, power is provided to the microphone 32. The microphone 32 can be linked to the battery in the vehicle 12 and selectively powered based on commands from the telematics unit 30 or the user. Once power is provided to the microphone 32, the method 500 proceeds to step 530.

At step 530, performance characteristics of the microphone are determined. For instance, the performance characteristics can include frequency response information, such as microphone cut-off frequency and dB roll-off. The performance characteristics can be stored on the microphone 32 using TEDS, an EEPROM, or another suitable memory source. When desired, the telematics device 30 or ASR system 210 can send a signal to the microphone 32 and obtain the performance characteristics. The method 500 then proceeds to step 540.

At step 540, the performance characteristics of the microphone are sent to the ASR system 210 and an adaptive hands-free algorithm. The performance characteristics of the microphone 32 can be wirelessly transmitted from the microphone 32 to the ASR system 210 or telematics unit 30. The characteristics can also be transmitted via the vehicle bus 44. The characteristics can be transmitted when a vehicle 12 is manufactured with its microphone 32, when the microphone 32 is replaced, or the ASR system 210 updates its software or materially changes in some way. Alternatively, the characteristics can also be transmitted when the user or the telematics device 30 requests. The method then proceeds to steps 550 and 560.

At step 550, the pre-trained acoustical model corresponding to particular performance characteristics is invoked. For example, the performance characteristics of the microphone can be compared with a database of pre-trained acoustical models. If the performance characteristics of the microphone substantially match performance characteristics in a pre-trained-acoustical model, then the matching pre-trained acoustical model is adopted and used by the ASR system 210 to process speech input received from the microphone 32. In this step, speech input is processing in a substantially similar manner as the processing of speech input in step 470 of method 400.

At step 560, the performance characteristics of the microphone 32 are received by an adaptive hands-free algorithm. For this step, the send-side processing, echo canceller, HFE, noise canceller, and send frequency equalization can be optimized. Techniques for performing these functions are well known to those in the art.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of tuning a speech recognition engine to an individual microphone, the method comprising:
    (a) providing a database containing acoustical models for a plurality of microphones;
    (b) receiving microphone performance characteristics from a microphone at a speech recognition engine;
    (c) searching the database for an acoustical model that matches the characteristics;
    (d) modifying the speech recognition engine based on the matching acoustical model; and
    (e) if no matching acoustical model is found, making adjustments to a feature extraction phase of speech recognition and using a default acoustic model modified by the adjustments to the feature extraction phase, wherein the adjustments include reducing cepstral parameters up to a high cut-off frequency such that only frequencies below the high cut-off frequency will be used for speech extraction.

2. The method of claim 1, wherein the microphone performance characteristics comprise at least one of frequency response, sensitivity, or signal bandwidth.

3. The method of claim 1, wherein the microphone performance characteristics are determined by testing the microphone and the determined results are recorded on the microphone.

4. The method of claim 1, wherein the microphone is carried by a vehicle.

5. The method of claim 1, wherein the database containing acoustical models is located at a call center.

6. The method of claim 1, wherein the microphone stores the microphone performance characteristics at the microphone.

7. The method of claim 5, wherein the microphone performance characteristics are stored on a microphone using a Transducer Electronic Data Sheet (TEDS).

8. The method of claim 1, wherein step (d) comprises limiting a high-frequency encoding (HFE) algorithm using the microphone performance characteristics.

9. A method of tuning a speech recognition engine to an individual microphone, the method comprising:
    (a) receiving microphone performance characteristics that are stored at a microphone;
    (b) searching a database for an acoustical model that matches the microphone performance characteristics;
    (c) if an acoustical model matches the microphone performance characteristics, uploading the matching acoustical model and applying the model to the speech recognition engine; and
    (d) if an acoustical model does not match the microphone performance characteristics, making adjustments to a feature extraction phase of speech recognition and using a default acoustic model modified by the adjustments to the feature extraction phase wherein the adjustments include reducing cepstral parameters up to a high cut-off frequency such that only frequencies below the high cut-off frequency will be used for speech extraction.

10. The method of claim 9, wherein the microphone performance characteristics comprise at least one of frequency response, sensitivity, or signal bandwidth.

11. The method of claim 9, wherein the microphone performance characteristics comprise data indicating the frequency response of the microphone.

12. The method of claim 9, wherein the microphone is carried by a vehicle.

13. The method of claim 9, further comprising providing a database containing acoustical models that is located at a call center.

14. The method of claim 9, wherein the microphone is a digital microphone.

15. The method of claim 9, wherein the microphone performance characteristics are stored on a microphone using a Transducer Electronic Data Sheet (TEDS).

16. The method of claim 9, wherein steps (c) and (d) comprise limiting a high-frequency encoding (HFE) algorithm using the data parameters.

17. A method of tuning a speech recognition engine to an individual microphone, the method comprising:
    (a) providing a database containing acoustical models for a plurality of microphones;
    (b) receiving data parameters from a digital microphone at a speech recognition engine, wherein the data parameters indicates the performance characteristics of the microphone;
    (c) searching the database for an acoustical model that matches the data parameters;
    (d) if an acoustical model is not matched to the data parameters, sending new data parameters to the digital microphone;
    (e) reconfiguring the digital microphone to perform based on the new data parameters; and
    (f) saving the new data parameters at the microphone.

18. The method of claim 17, wherein the digital microphone includes a bandpass filter or a digital filter.

* * * * *